April 11, 1933.  H. STRUEVER  1,903,577
PICK-UP FOR COMBINE HARVESTERS
Filed Dec. 6, 1930  9 Sheets-Sheet 7

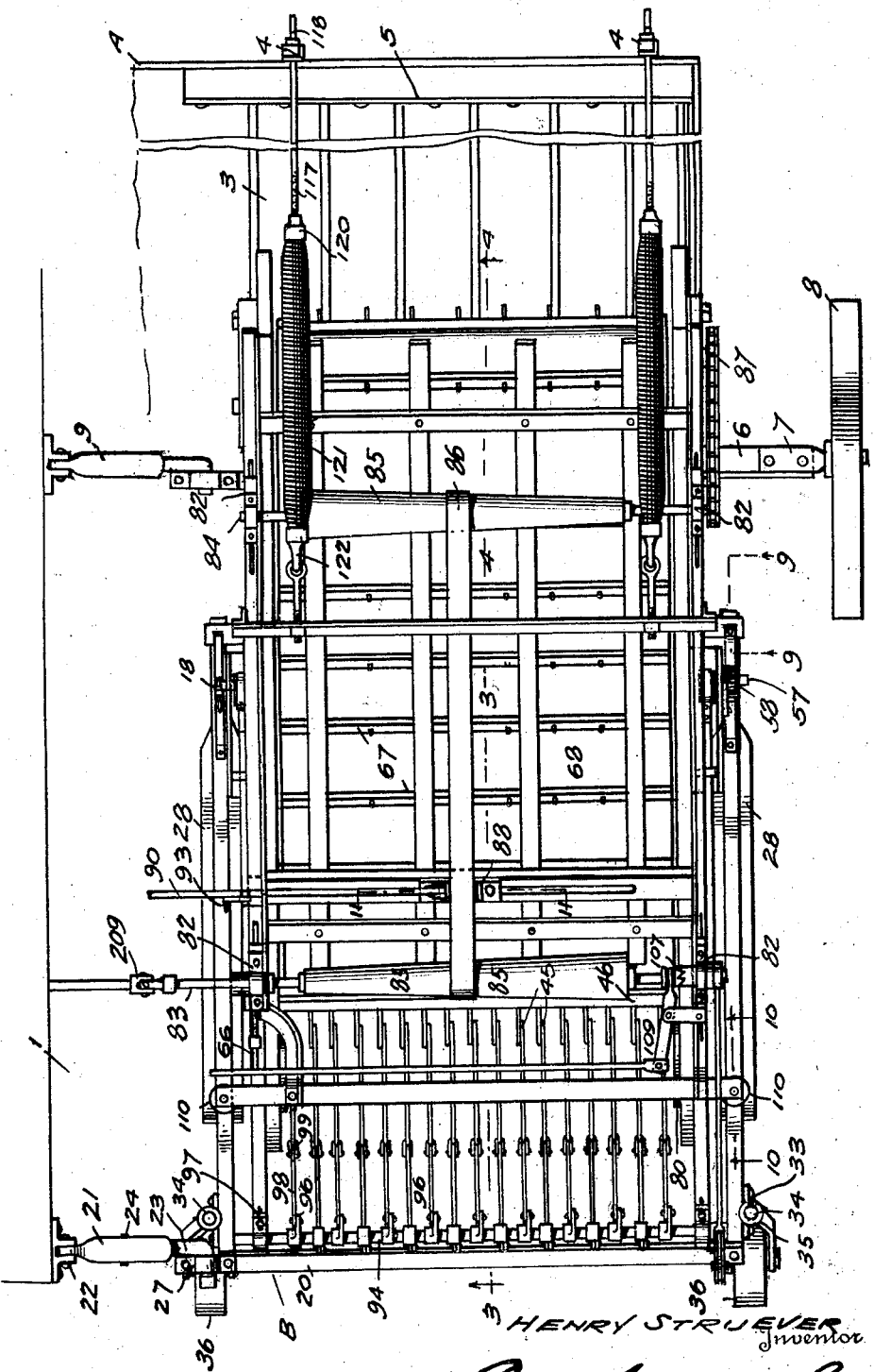

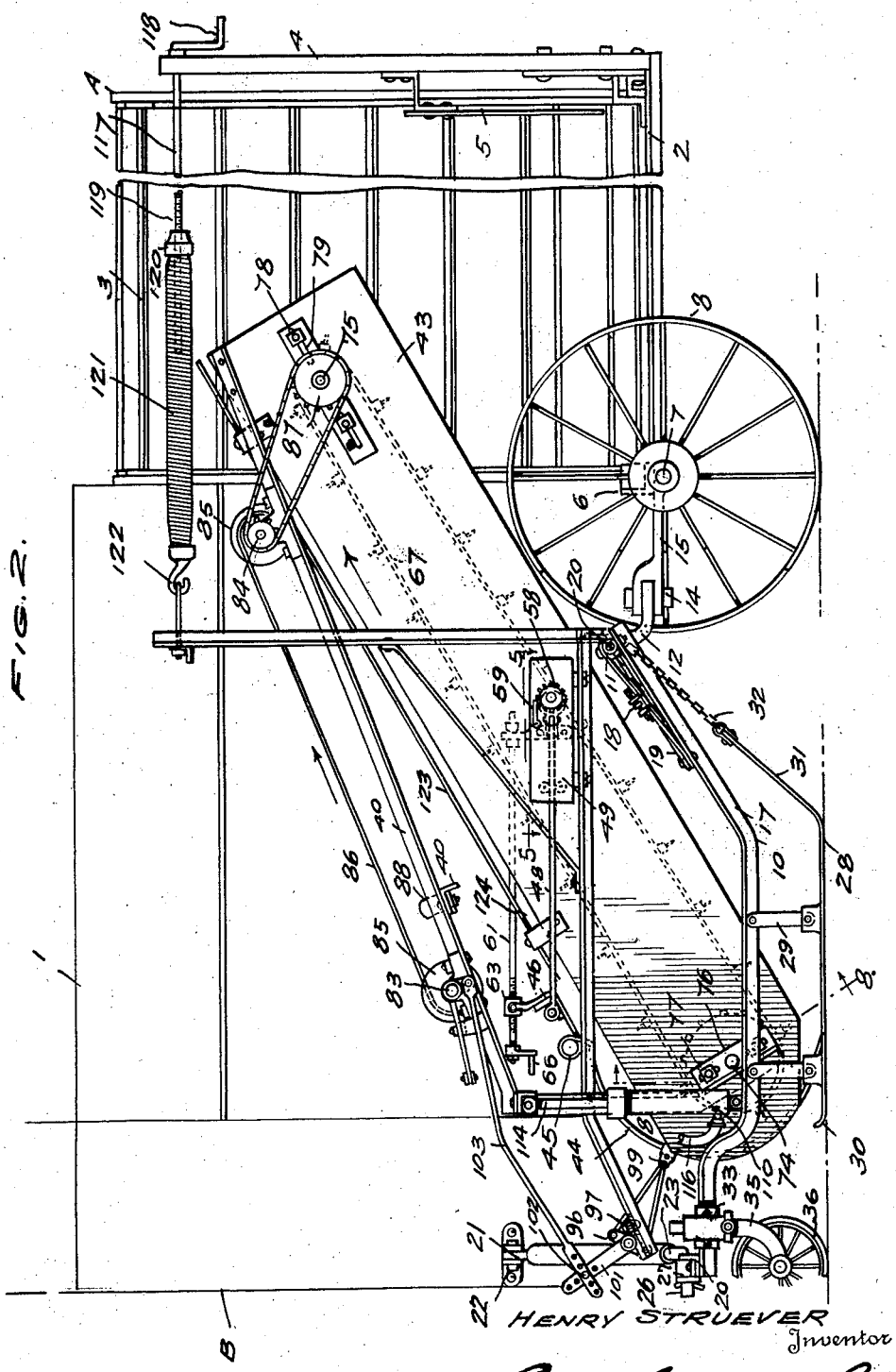

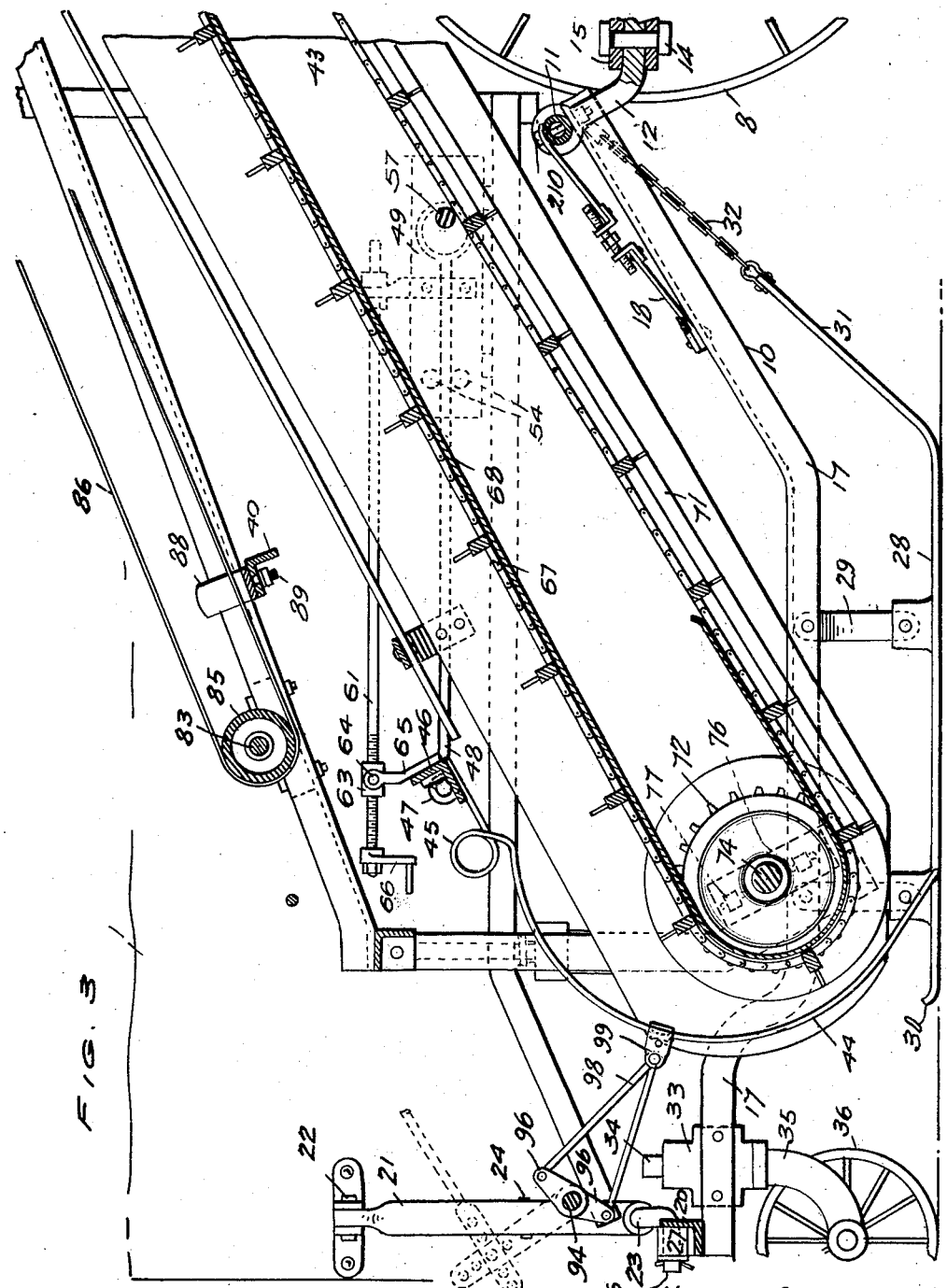

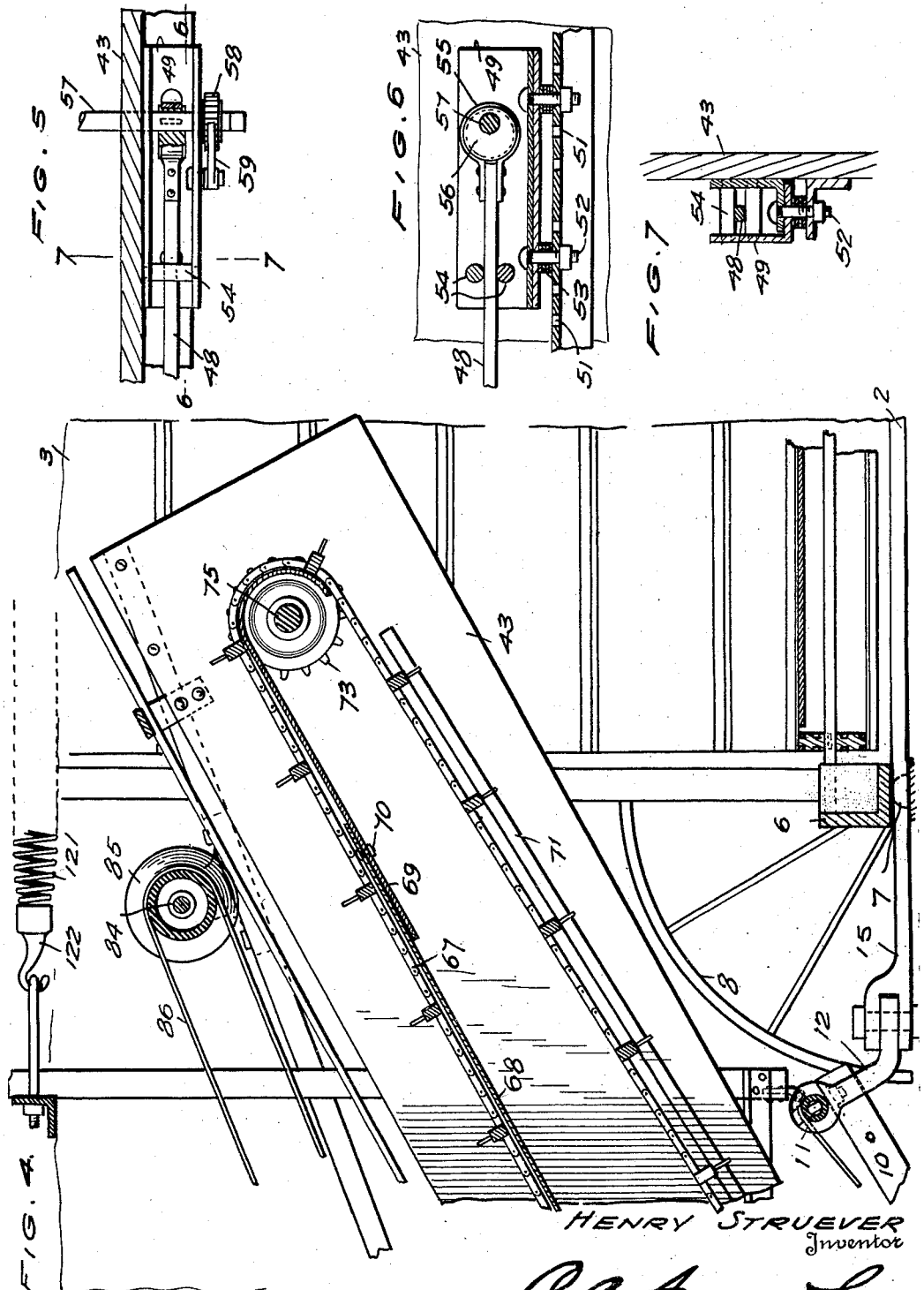

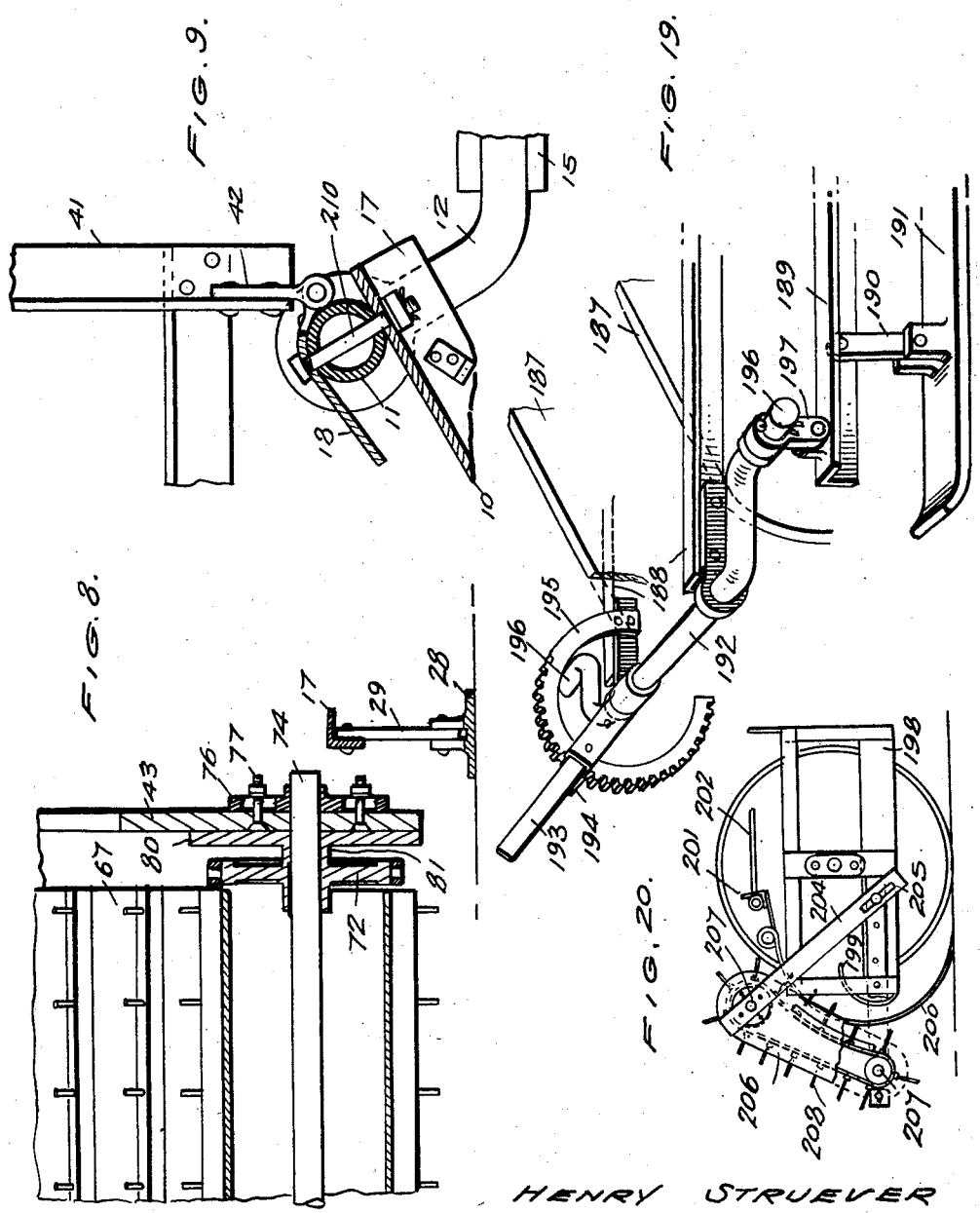

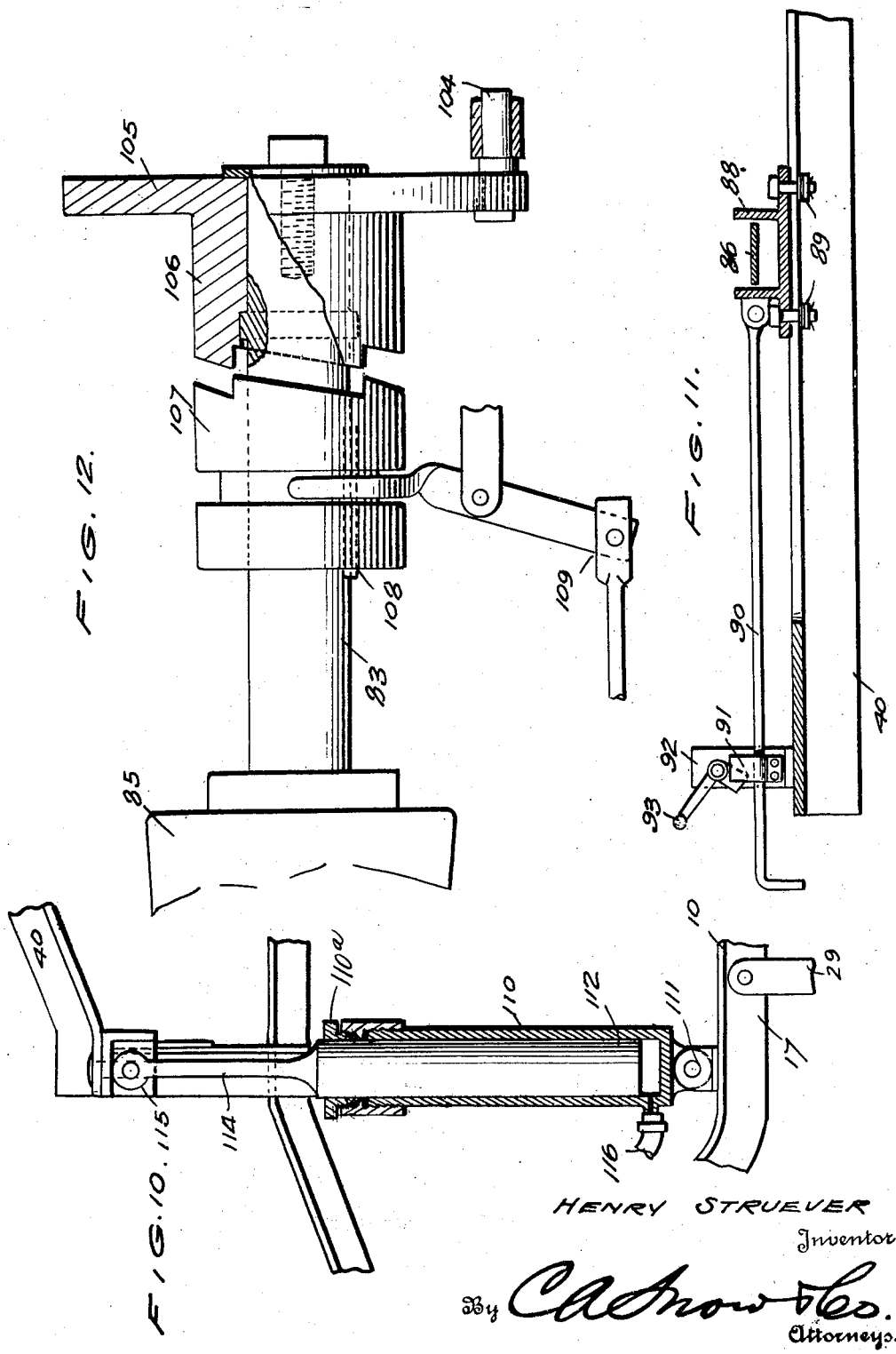

HENRY STRUEVER
Inventor

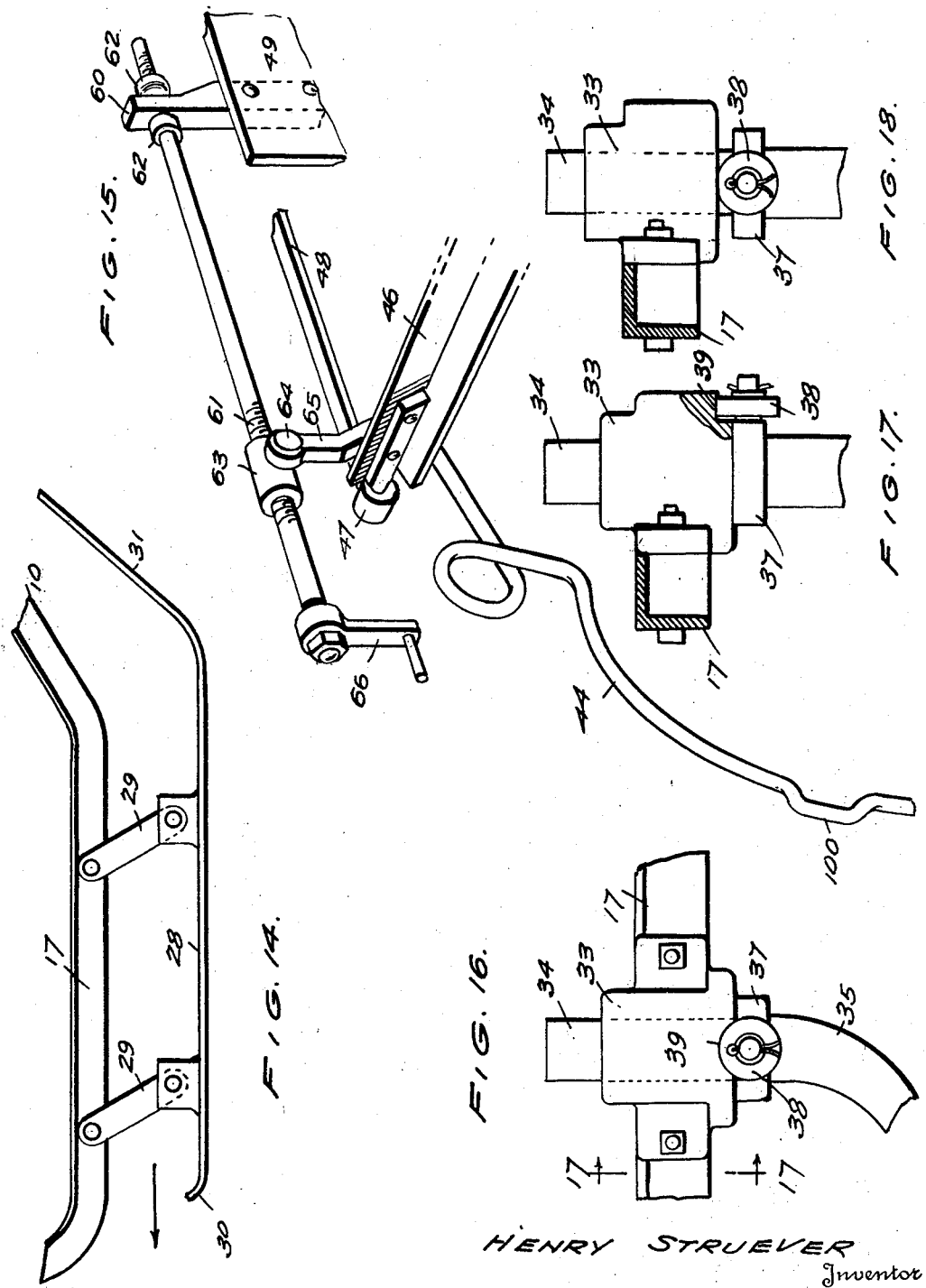

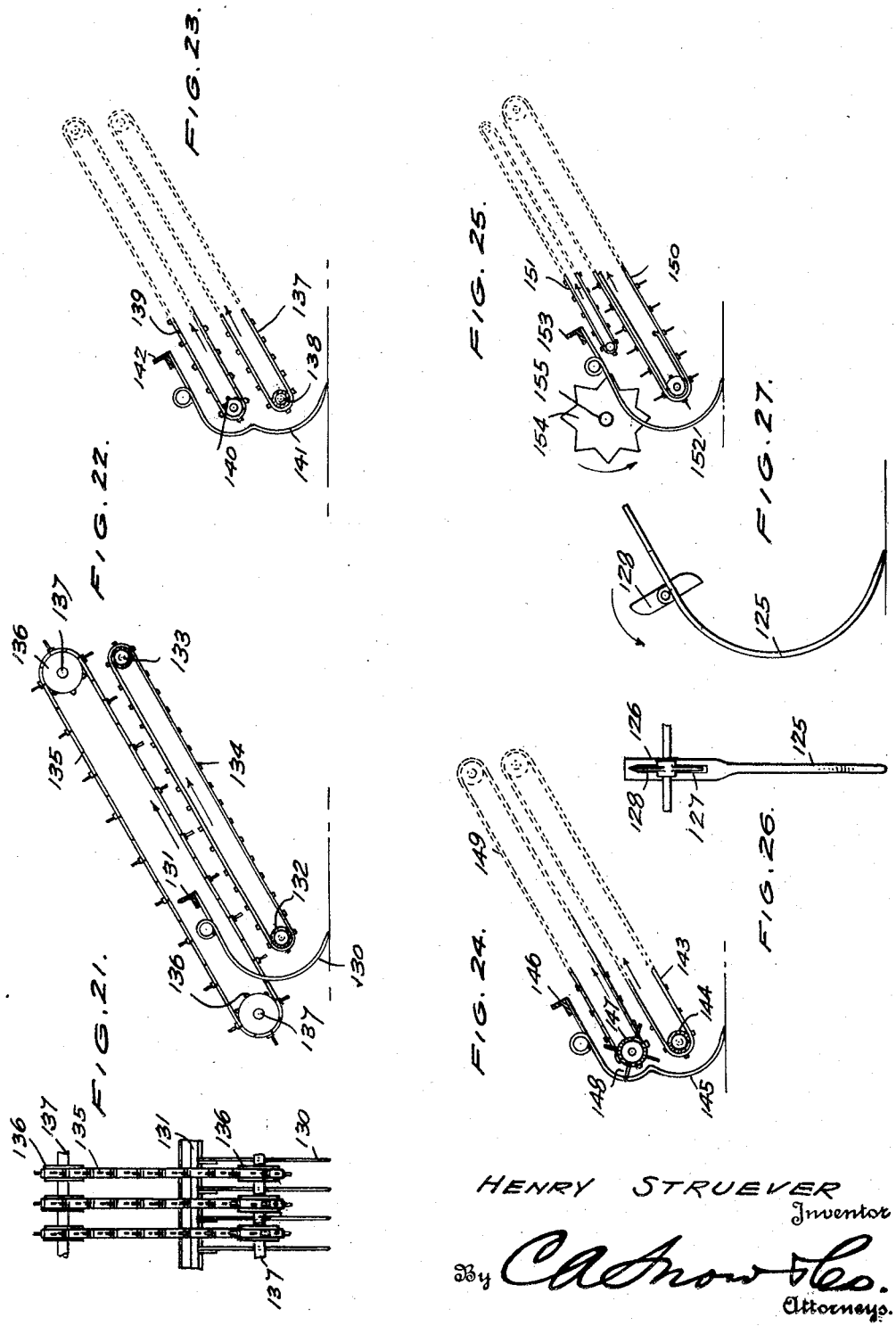

Patented Apr. 11, 1933

1,903,577

UNITED STATES PATENT OFFICE

HENRY STRUEVER, OF FAULKTON, SOUTH DAKOTA

PICK UP FOR COMBINE HARVESTERS

Application filed December 6, 1930. Serial No. 500,645.

The device forming the subject matter of this application is a combined collecting and delivery mechanism, which can collect a variety of materials, including hay, grain, beans, or anything else, and depositing the material on the platform conveyor of a combine or other vehicle. The invention aims to provide a device which will pick up grain in windrows better than machines which have preceded it, the machine operating with a greatly decreased loss of grain. Other objects are: to provide a pickup machine which will operate properly without disturbances by stones or rocks, or by passing over uneven ground, or by encountering windrows that have been beaten into the ground by rain or other causes. The invention aims to provide a machine which will pick up windrow grain which is not supported by stubble, it being possible to pick the grain off the bare ground, if necessary, to save all grain or heads of grain which may be below the top of the stubble. Other objects are: to improve the conveyor mechanism, the rake mechanism, the means whereby these instrumentalities are operated and controlled, and the means whereby the pickup is connected to the combine or other power driven vehicle.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in top plan, a machine constructed in accordance with the invention, assembled with a combine, parts of the combine platform being broken away.

Figure 2 is a side elevation wherein parts of the combine platform and attendant parts are broken away.

Figure 3 is a partial longitudinal section taken on the line 3—3 of Figure 1.

Figure 4 is a vertical longitudinal section, supplemental to Figure 3, and taken on the line 4—4 of Figure 1.

Figure 5 is a section on the line 5—5 of Figure 2.

Figure 6 is a section on the line 6—6 of Figure 5.

Figure 7 is a section on the line 7—7 of Figure 5.

Figure 8 is a section on the line 8—8 of Figure 2.

Figure 9 is a section on the line 9—9 of Figure 1.

Figure 10 is a section on the line 10—10 of Figure 1.

Figure 11 is a section on the line 11—11 of Figure 1.

Figure 12 is an elevation showing one of the clutches, parts being in section.

Figure 14 is a diagrammatic elevation referred to in explaining the operation of the device.

Figure 15 is a perspective view of one of the means whereby the rake teeth are adjusted.

Figure 16 is an elevation disclosing the shaft for the castor wheel and the mounting of the shaft.

Figure 17 is a section on the line 17—17 of Figure 16.

Figure 18 is a sectional view illustrating the shaft of the castor wheel as it will appear after it has been rotated through an arc of about ninety degrees from the position that the shaft occupies in Figure 16.

Figure 19 is a perspective view showing a modified means for producing relative vertical movement between the main frame and the shoe frame.

Figure 20 is a diagrammatic elevation disclosing a modification in the invention.

Figure 21 is an elevation showing a modified conveyor.

Figure 22 is a sectional view of the structure depicted in Figure 21, certain parts that appear in Figure 22 being omitted in Figure 21.

Figure 23 is a diagrammatic elevation showing another modification in the conveyor.

Figure 24 is a diagrammatic elevation showing a further modification in the conveyor.

Figure 25 is a diagrammatic elevation in which another modification of the conveying mechanism is shown.

Figure 26 is an elevation showing a modified rake tooth.

Figure 27 is an elevation wherein the tooth of Figure 26 is viewed at right angles to the showing of that figure.

Figure 13:
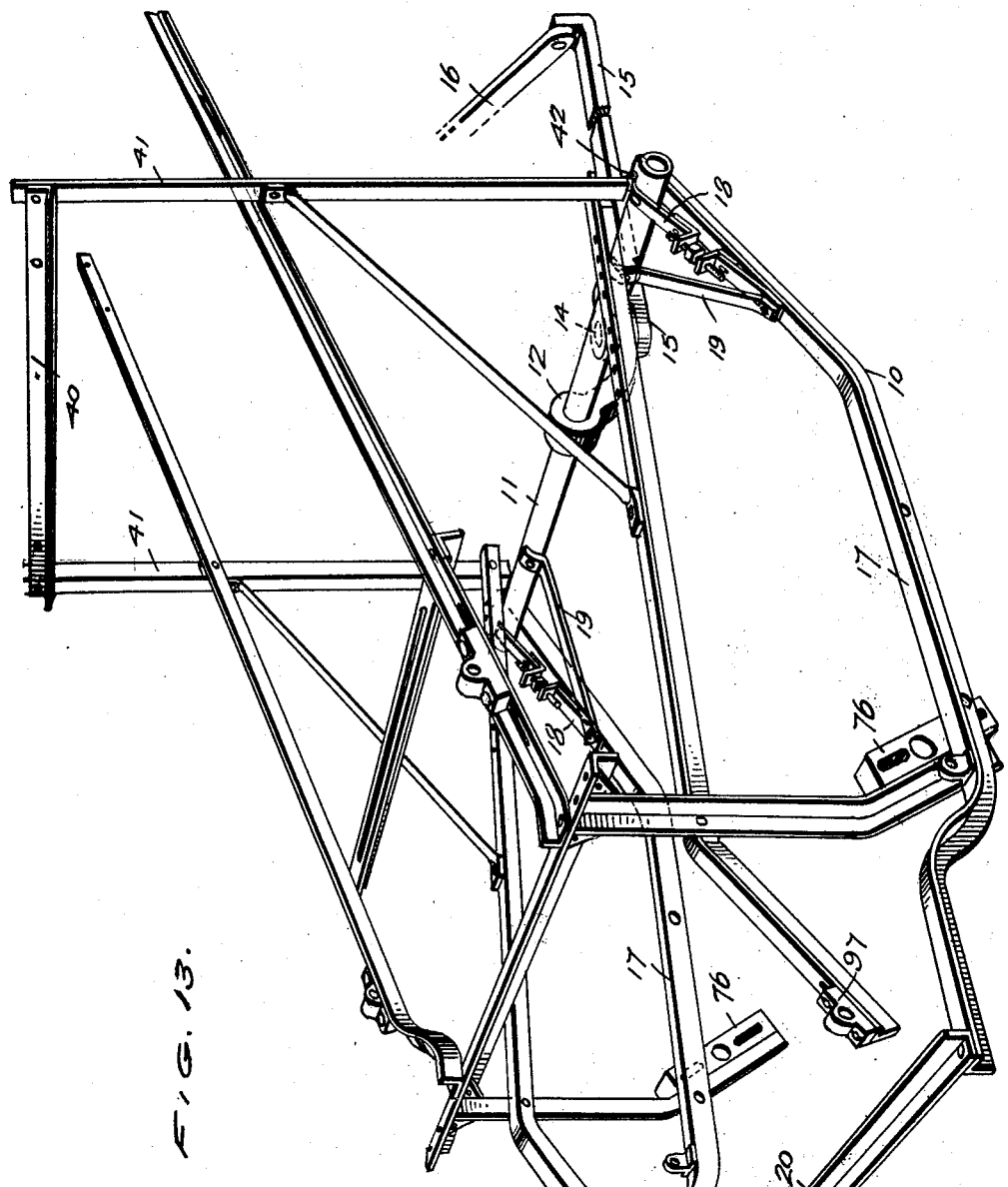
Figure 13 is a perspective view showing the main frame and the shoe frame, upon which the remaining parts of the machine are carried, either mediately or immediately.

The device forming the subject matter of this application embodies a mechanism which, when used for the purpose of picking up grain or hay in windrows or in a swath, is known as a "pick-up," the aforesaid mechanism being denominated a "hay-loader" when used or constructed for collecting hay. The pick-up is adapted to be connected to a combine, and, although the device may be used in connection with combines of various sorts, it has been deemed expedient to define, in a general way, the structure of the combine, as a preliminary portion of the description.

In order that the positions of the various parts of the machine may be defined relatively to each other, that end of the machine to which the reference character "A" has been applied in Figures 1 and 2 may be considered as the forward end, the rear end being designated by the reference numeral "B".

In Figures 1, 2, and 3, the body of the combine is shown at 1, and in Figure 2, the combine platform is shown at 2. One of the conveyors of the combine is designated by the numeral 3. The combine platform 2 carries a support 4 on which is mounted a windshield 5. One frame piece of the combine platform is marked by the numeral 6, and is heavy enough so that an axle 7 may be secured to one end of it, a ground wheel 8 being journaled on the axle 7. A castor wheel may be used on the axle 7, in place of the ground wheel 8, this being a mechanical detail which need not be illustrated. The opposite end of the frame piece 6 is united by a flexible connection 9 to the body 1 of the combine.

As to the running gear, it will be noted, referring especially to Figure 13, that there is supplied a shoe frame 10, which is a composite structure. The shoe frame 10 embodies a transverse member 11 which may be a strong piece of pipe, on which a hitch 12 is mounted for vertical swinging movement. The hitch 12 is pivoted at 14 to a draw bar 15 connected to the platform 2 of the combine, and sustained by a brace 16 from the platform portion of the combine. Owing to the provision of the hitch 12, the shoe frame 10 is connected flexibly to the platform portion of the combine.

The shoe frame 10 includes side bars 17 connected by bolts 210 (Figure 9) and by longitudinally extensible braces 18 (Figure 3) to the transverse member 11, the braces 18 being adjustable in order to secure parallelism in the side bars 17 of the shoe frame 10: the shoe frame, ultimately, however, being made a rigid structure, through the instrumentality of inclined braces 19, which connect the side bars 17 with the transverse member 11 (Figure 13), and through the instrumentality of a cross piece 20, connected to the rear ends of the bars 17. One end of the cross piece 20 is united to the body 1 of the combine by a connection which is shown in Figures 13 and 3. This connection or brace may embody a tube 21 which is pivotally connected at 22 to the body 1 of the combine, a rod 23 having telescopic movement in the tube 21. The rod 23 carries a cross pin 24 which slides in elongated slots 25 in the tube 21. The rod 23 is provided in one end with a rectangularly disposed finger 26 mounted to rock in a bearing 27 on the cross piece 20 of the shoe frame 10.

Shoes 28 are provided, and are connected to the side bars 17 of the shoe frame 10 by rigid, pivotally mounted links 29, the construction being such that the links 29 can swing in vertical planes, parallel to the side bars 17, but not otherwise. The forward ends 31 of the shoes 28 are upwardly inclined, so as not to dig into the ground when the machine moves forwardly, and the rear ends 30 of the shoes are upwardly inclined, so that they will not dig into the ground when the machine is set aback. Flexible elements 32, such as chains, are connected at their rear ends, to the forward portions 31 of the shoes, and at their forward ends to the side bars 17 of the shoe frame 10, although the forward ends of the flexible elements 32 may be anchored otherwise, if desired.

On the rear ends of the side bars 17 of the shoe frame 10 are mounted bearings 33 (Figures 2, 16, 17, and 18) in which are journaled vertical shafts 34 having offset lower ends 35 whereon are journaled castor wheels 36. Collars 37 are secured to the shafts 34 of the castor wheels 36, the bearings 33 resting on the collars 37. The collars 37 carry outstanding projections, which may be rollers 38 journaled on the collars. When the castor wheels 36 are in the position of Figure 2 and stand parallel to the line of advance of the machine as it is moving ahead, the rollers 38 are engaged in seats 39 (Figures 16 and 17) which are formed in the lower ends of the bearings 33.

Figure 13 shows that the machine embodies a main frame which, as a whole, is designated by the numeral 40. Parts of the main frame 40 which have special significance will be alluded to hereinafter. The main frame 40 includes forward posts 41 which are connected by hinges 42 (Figure 9) to the forward end of the shoe frame 10, the construction being such that the shoe frame 10 and the main frame 40 can have vertical swinging movement with respect to each other. Side plates 43 (Figure 2), which may be either wood or metal, are mounted on the main frame 40.

The collecting mechanism comprises teeth 44 which may embody one or more coils 45 adding to the resiliency of the teeth. The teeth 44 curve downwardly and rearwardly somewhat similar to those of an ordinary hay rake, as shown in Figure 3. The teeth 44 are spaced transversely as may be desired and are secured to a shaft 46 (Figures 3 and 15) which is journaled at 47 for adjustment in spring arms 48 which extend longitudinally of the machine, as shown, for instance, in Figure 2. Casings 49 are provided, and may be made of angle members, as shown in Figure 7. The casings 49 lie up against the side plates 43. Certain horizontal portions of the main frame 40 have longitudinally spaced openings 51 (Figure 6) adapted to receive securing elements 52, such as bolts, which hold the constituent parts of the casings 49 together and retain the the casings on the main frame 40. Removable spacers 53, in the form of washers, are mounted on the securing elements 52 between the bottoms of the casings 49 and the parts of the main frame 40 that have the holes 51. Roller supports 54 (Figures 5 and 6) are journaled in the casings 49. The spring arms 48 extend backwardly between the roller supports 54 and are provided at the forward ends with straps 55 engaged about eccentrics 56 carried by a shaft 57 which is mounted for rocking movement in the casing 49 and in the side plates 43. A locking wheel 58 (Figures 5 and 2) is secured to the shaft 57. A pawl 59 is pivoted to one of the casings 49 and engages the locking wheel 58 to hold the shaft 57 in any position to which it may have been rotated.

Figure 15 shows that a post 60 is secured to one of the casings 49. In the post 60, an adjustable member, such as a screw 61 is held at 62 for rotation, but against longitudinal movement. The screw 61 is threaded into a nut 63 which is pivoted at 64 to a crank arm 65 on the shaft 46 which carries the teeth 44. The screw 61 may be rotated by means of a crank 66, or equivalent device.

An endless conveyor 67 is located between the side plates 43. The conveyor 67 may be of many different constructions, and, therefore, it need not be described in detail. Some type of conveyors call for a deck 68, on which the upper run of the conveyor travels, the deck 68 being mounted between the side plates 43. As disclosed in Figure 4, the deck may be composed of separate pieces which are overlapped on each other, as at 69, and connected, as shown at 70, the construction being such that the deck may be adjusted so that it will cooperate with the upper run of the conveyor 67. The lower run of the conveyor 67 traverses guide rails 71 carried by the side plates 43 of the conveyor frame. The conveyor 67 operates under hold-down slats 123 carried by brackets 124 on the side plates 43 of the conveyor frame, the slats 123 serving to prevent the harvested grain from being blown away or scattered as it is being carried upwardly by the conveyor 67.

The endless conveyor 67 is carried by lower sprocket wheels 72 (Figure 3) and by upper sprocket wheels 73 (Figure 4). The lower sprocket wheels 72 are mounted on a shaft 74, and the upper sprocket wheels 73 are mounted on a shaft 75. It appears in Figure 2 that the shaft 74 is journaled in bearings 76 mounted at 77 on the side plates 43, for adjustment transversely of the side plates. The shaft 75 is journaled in bearings 78 adjustably mounted at 79 on the side plates 43 for adjustment lengthwise of the side plates. The construction is such that the upper sprocket wheels 73 may be adjusted longitudinally of the side plates to tighten or loosen the endless conveyor 67.

Because the bearing 76 for the shaft 74 can be adjusted transversely of the side plates 43, the lower sprocket wheels 72 and the endless conveyor 67 may be adjusted so that the conveyor will cooperate to best advantage with the teeth 44, to raise the collected material upwardly along the curved portions of the teeth.

A disk 80 (Figure 8) is located between each of the lower sprocket wheels 72 and one of the side plates 43. The disk 80 and the sprocket wheels 72 may be carried by a single hub 81 secured to the shaft 74. The disk 80 is for the purpose of preventing straw or other trash from wrapping around the shaft 74 or getting into the wheel 72. The disk 80 also assists in the elevation of the material on the conveyor 67.

By reason of the fact that the yield is variable, resulting in different sizes of swaths or windrows, it is desirable to have a speed change mechanism for governing the movement of the conveyor 67, although a speed change mechanism is not absolutely essential. The speed change mechanism may be of any desired sort, but a simple and satisfactory form is shown in the drawings.

In the connection, it is to be observed that, as disclosed in Figure 1, adjustable bearings 82 are mounted on the main frame 40. In the bearings 82, a rear shaft 83 and a forward shaft 84 are journaled for rotation, the rear shaft 83 being connected at 209, through the medium of a universal joint, with the combine, so that the shaft 83 may be driven from the combine. The shafts 83 and 84 carry oppositely-tapered elongated pulleys 85, about which is engaged a belt 86. A chain and sprocket wheel drive 87, to be seen in Figure 2, forms an operative connection between the shaft 84 and the shaft 75 which carries the upper driving sprocket wheels 73 for the endless conveyor 67. The belt 86 cooperates with a belt guide 88 (Figure 11) which is slidably mounted at 89 in a slot in the main frame 40. An operating rod 90 is pivoted to the belt guide 88 and slides within a compressible jaw 91 on a post 92 carried by the frame 40. A clamp 93 is pivotally mounted on the post 92 and coacts with the jaw 91 to cause the jaw to keep the rod 90 in any position to which it may have been adjusted.

Under some conditions, for instance, when a field is unusually weedy, or the straw exceedingly damp, it may be desirable to have means for imparting oscillatory movement to the teeth 44, in order to prevent an excessive accumulation on the points of the teeth. The teeth 44, by reason of their resiliency, will tend to swing or slip past stones and similar obstacles, but it may be desirable to have an oscillator for the teeth, in order to keep the teeth clean, and a simple means to that end is shown in the drawings.

Adjustable bearings 97 (Figure 2) are mounted on the forward portion of the main frame 40, and in the bearings a shaft 94 is mounted for rotation. The shaft 94 has arms 96. Every other arm 96 extends upwardly, and the alternating arms extend downwardly. The rear ends of links 98 are pivoted to the arms 96 and the forward ends of the links are pivotally connected alternately to clamps 99 held in seats 100 (Figure 15) formed in the teeth 44. A crank arm 101 (Figure 2) is carried by the shaft 94. There is an adjustable pivotal connection 103 between the crank arm 101 and a pitman 103, the pitman being pivotally mounted at 104 (Figure 12) on a crank wheel 105, the crank wheel being carried by a hub or clutch 106 in which the shaft 83 is journaled for rotation. The clutch member or hub 106 is adapted to cooperate with a clutch member 107 splined at 108 to the shaft 83, to rotate with the said shaft, and to slide therealong, into and out of engagement with the clutch member 106.

The numeral 109 marks a shifting mechanism for the clutch 107, and the shifting mechanism may be of any common or desired construction. It will be understood, without specific delineation, that the operating mechanism 109 of Figure 12, the rod 90 of Figure 11, and the clamp 93 may be actuated from a remote point, this being a detail which can be dealt with by a skilled mechanic.

A means is provided for raising and lowering the main frame 40, it being recalled that the frame 40 is hingedly connected at 42 (Figure 9) with the shoe frame 10. In order to raise and lower the main frame 40, to adjust the position of the rake teeth 44 with respect to the surface of the soil, there is provided a cylinder 110 (Figure 10) which is pivotally connected at 111 to the shoe frame 10. In a gland 110a on the cylinder 110, there is a slidably mounted piston 112, the rod 114 of which is pivoted at 115 to the forward end of the main frame 40. There may be one or more of these raising and lowering devices. Each cylinder 110 is adapted to contain fluid under pressure delivered through a conduit 116. No means for supplying fluid under pressure to the conduit 116 is shown, because pumps adapted for that purpose are a common article of manufacture and sale. The means for delivering fluid under pressure to the conduit 116 may be mounted on the combine 1, or elsewhere.

Pick-ups now on the market have balancing devices which are exceedingly cumbersome and complicated in some instances, and the present invention contemplates improvements along the line mentioned. The frame 4 which carries the windshield 5 (Figure 2) may serve as a place of journaling for shafts 117 which are operated by cranks 118, or otherwise. The shafts 117 are threaded at 119 into caps 120 on retractile springs 121, the springs being connected at 122 to the upper rear portion of the main frame 40.

Referring to Figures 26 and 27, there is shown a modified rake tooth 125, which is widened, as at 126, at its upper end, a slot 127 being formed in the widened part of the tooth. A knife 128 is mounted on a shaft 129 which is journaled for rotation, the knife 128 operating through the slot 127. The knife 128 serves to keep the teeth clean, and assists in delivering the cut grain or hay to the conveyor. The knife might be disposed otherwise than in the slot 127.

Various kinds of conveyors, other than the one hereinbefore described, may be used, a few illustrations being given, and no attempt being made to set forth every form of conveyor which will prove useful.

In Figures 21 and 22, the teeth 130 are attached to a shaft 131, like the part 46 of Figure 15. The numeral 132 designates a lower roller, and the numeral 133 designates an upper roller, about which is engaged a conveyor 134 made of canvas or other suitable material. The numeral 135 designates endless spiked chains carried by sprocket wheels 136 on a shaft 137. The chains 135 operate between the teeth 130. The conveyor 134 and the sprocket chains 135 operate in the direction indicated by the arrows in Figure 22. The chains 135 assist in carrying up the grain on the conveyor 134. In Figure 21, the conveyor 134 and attendant parts have been omitted, in order that the chains 135 may the more clearly appear, in relation to the teeth 130.

In Figure 23, there is shown a flexible conveyor 137 carried by rollers 138. Above the conveyor 137 is located a slatted conveyor 139 operated by sprocket wheels 140. The teeth are shown at 141 and are connected to the adjusting shaft 142. In this form, the teeth extend up over the conveyor 139, and not between the conveyors, as in Figure 22. Any equivalent for the conveyors shown may be used.

In Figure 24, there is shown a lower conveyor 143 on rollers 144. Teeth 145 are carried by a shaft 146. The numeral 147 marks a roller having spikes 148 that operate between the teeth 145. The roller 147 carries an upper conveyor 149 which may be in the form of chains, or of any other suitable construction.

In Figure 25, there is shown a lower conveyor 150, with a smaller and shorter conveyor 151 above it. The teeth 152 are attached to the shaft 153 and extend above the conveyor 151. Stelliform disks 154 on a shaft 155 operate between the teeth 152 at the lower end of the conveyor 151 and aid in the upward conveyance of the cut grain or hay, and may be used with any of the conveyors (except that of Figure 2) where necessary.

The fluid pressure mechanism of Figure 10, used for raising and lowering the main frame 40 with respect to the shoe frame 10, sometimes is replaced by the simpler mechanism of Figure 19. In Figure 19, the side plates of the conveyor frame are shown at 187 and correspond to the side plates 43. The main frame 188 is the counterpart of the main frame 40 and the shoe frame 189 is connected at 190, as hereinbefore described, to the shoes 191. A shaft 192 is journaled on the main frame 188 and carries a handle 193 provided with a latch mechanism 194 adapted to cooperate with a segment 195 on the main frame 188. The shaft 192 has cranks 196 at its ends, and links 197 are connected pivotally to the cranks and to the shoe frame 189. It will be obvious that by rocking the shaft 192 through the medium of the handle 193, the main frame 188 will be raised and lowered with respect to the shoe frame 189, the main frame 188 being held in adjusted position by engaging the latch mechanism 194 with the segment 195.

A simplified form of the invention appears in Figure 20, which shows a wheel-mounted frame 198 carrying a curved deck 199. The teeth 200 extend upwardly over the deck 199 and are connected to the shaft 201, corresponding to the shaft 46 of Figure 15. The spring arms that carry the shaft 201 are designated by the numeral 202. An endless conveyor 203 is carried by supports 204 adjustably mounted at 205 on the frame 198, the side plates of the conveyor frame being shown at 206, and the conveyor shafts at 207. The conveyor 203 may embody projecting spikes 208 of any desired length, adapted to enter between the teeth 200, and to operate in a way which will be understood readily upon a casual inspection of Figure 20. This form of the invention may be used with a combine, like the preferred form.

Referring to the invention as disclosed in Figure 2, the grain is picked up from the windrows or off the ground by the teeth 44 which cause it to be carried upwardly and forwardly by the conveyor 67, the material being deposited upon the conveyor 3 of the combine platform 2. The drive for the conveyor 67 is by way of the connection 209 (Figure 1) of the combine, the shaft 83, the tapered pulleys 85, the belt 86, the chain and sprocket drive 87 of Figure 2, the shaft 75, and the sprockets 73 of Figure 4. The speed at which the conveyor moves may be adjusted by shifting the belt 86 along the oppositely-tapered pulleys 85, this shifting being brought about by the mechanism of Figure 11. The rod 90 may be moved endwise, thereby to operate the belt guide 99, and after the necessary adjustment has been attained, the clamp 93 may be swung down to cause the jaw 91 to engage the rod 90 and hold it in adjusted position.

Referring to Figure 15, it will be understood that when the screw 61 is rotated by the crank 66, the nut 63 will move along the screw 61, swinging movement being imparted to the shaft 46 by the arm 65, the rake teeth 44 being adjusted up or down.

Noting Figure 2 in connection with Figures 5, 6, and 7, it will be understood that the casings 49 may be adjusted forwardly or backwardly, the bolts 52 being mounted in any of the holes 51 in the frame 40. By this operation, the teeth 44 may be shifted forwardly or backwardly. The casings 49 (Figure 6) may be raised and lowered by putting in or taking out the spacers shown at 53, thereby securing a raising and lowering of the casings 49 and the teeth 44. A further adjustment in the position of the teeth 44 may be obtained by rotating the shaft 57, the eccentrics 65 cooperating with the straps 55 to impart movement to the spring arms 48, and, therefore, to the teeth 44. The spring arms 48 support the teeth 44 yieldably and cause them to ride over inequalities in the surface which is being raked.

The piston 112 and the piston rod 114 of Figure 10 may be caused to move vertically in the cylinder 110 by varying the pressure supplied through the conduit 116. In this way, the main frame 40 may be raised and lowered with respect to the shoe frame 10, the main frame swinging on the hinges 42 of Figure 9, both the conveyor 67 and the teeth 44 being raised and lowered, together, because these parts are carried on the main frame 40.

Through the instrumentality of the mechanism shown at 109 in Figure 12, the clutch member 107 may be engaged with the clutch member 106. Then there is established a driving train comprising the shaft 83, the clutch member 107, the clutch member 106, the crank wheel 105, the pitman 103, the crank arm 101, the shaft 94, the arms 96, the links 98, and the teeth 44, the oscillation of the teeth serving to keep them clean when they are working in damp grain or the like.

Because the machine ordinarily rides on the shoes 28, as shown in Figure 2, the machine follows the general contour of the ground more evenly, and the grain is picked up more completely by the rake teeth 44, than is possible when the machine is carried on castor wheels alone. If, however, the ground is so smooth that the operator wishes to dispense with the shoes 28 as a supporting means, this can be done by shortening the chains 32 and pulling the shoes forward so that they hang clear of the ground, suspended upon the links 29.

When the machine moves otherwise than ahead, for example, when it is set aback, the shoe frame 10 for a little while moves back independently of the shoes 28, as disclosed in Figure 14. The castor wheels 36 quickly and firmly take hold on the ground and the shafts 34 (Figures 16 and 3) are rotated in the bearings 33, because the castor wheels are mounted on the inclined ends 35 of the shafts. When the shafts 34 are rotated, the rollers 38 of the shafts ride out of the seats 39 (Figures 16 and 17) in the bearings, and run upon the lower end surfaces of the bearings (Figure 18). By this operation, the shoe frame 10 and the main frame 40 are raised, the rake teeth 44 and the shoes 28 being lifted, and the machine being given a freedom of movement which it would not have otherwise. When the machine starts ahead again, the shafts 34 rotate, the castor wheels 36 assume the trailing position of Figure 3, the castor wheels being held in that position when the rollers 38 ride back into the seats 39 (Figure 16) and the shoes 28 resume the operative position of Figure 2.

The tension of the springs 121 of Figure 2 may be adjusted by rotating the shafts 117. The springs 121 aid in taking some of the weight off the shoes 28, and they also aid in holding up the front end of the combine platform 2.

It is to be observed that the pick-up mechanism, including the rake teeth 44 and the conveyor 67, is placed to the rear of the combine platform 2, the conveyor 67 carrying the grain upwardly and forwardly, the present practice being to place the pick-up in such a position with respect to the combine platform that the material gathered is conveyed rearwardly before it is dropped on the combine platform.

With reference to the connection between the pick-up and the combine, it should be noted that the hitch 12 of Figure 13 can turn on the transverse frame member 11. This construction gives freedom of movement between the pick-up and the combine, whilst the machine is traveling over an uneven piece of ground, and permits the shoes 28 to operate advantageously, as hereinbefore explained. The brace or connection 21—23 of Figure 1, and the connection at 9, keeps the pick-up at proper distance from the combine and the combine platform while making turns or backing, and, generally, will aid in keeping the pick-up placed properly. Referring to Figure 3, the pick-up has a three-point support: namely, at the connection 21—23, on the shoes 28, or on the castor wheels 36. This construction gives the pick-up a flexibility not possessed by other pick-ups now on the market, the practice being to bolt the pick-up rigidly to the combine frame, and it being impossible for the pick-up to operate flexibly, independently of the combine platform.

What is claimed is:—

1. In a device of the class described, a towing vehicle, a pick-up connected to the towing vehicle and comprising a main frame mounted for vertical swinging movement, cooperating collecting and conveying mechanisms, one of which is carried by the main frame, and a spring connection between the towing vehicle and the main frame and forming a counterpoise for the frame and said cooperating mechanisms.

2. In a device of the class described, a combine having a lateral platform, a conveyor mounted on the combine platform, a frame on the combine platform, a windshield carried by the frame and located in front of the conveyor, a pick-up located behind the combine platform and comprising a main frame mounted for vertical swinging movement, a conveying mechanism on the main frame and discharging on the conveyor of the combine, collecting means on the main frame and coacting with the conveying mechanism, and a spring connection extended between the frames and forming a counterpoise for the main frame, the conveying mechanism on the main frame and the collecting means on the main frame.

3. In a device of the class described, a pick-up; cooperating members comprising a towing vehicle and a main frame forming part of the pick-up, the main frame being mounted for vertical swinging movement; a conveying mechanism on the main frame, a collecting means on the main frame and coacting with the conveying mechanism, a spring forming a counterpoise for the main frame, the conveying mechanism and the collecting means, means for connecting the spring to each of said cooperating members, one of the last-specified means being adjustably connected to the spring to vary the effectiveness thereof as a counterpoise, and a connection between the pick-up and the towing vehicle.

4. In a device of the class described, a conveyor frame, a collecting means, mechanism for supporting the collecting means at one end of the conveyor frame, an endless conveyor cooperating with the collecting means, shafts which carry the conveyor, means for mounting one shaft for rotation, and for adjustment longitudinally of the conveyor frame thereby to tighten the conveyor, and means for mounting the other shaft for rotation, and for adjustment transversely of the conveyor frame thereby to permit the conveyor to be adjusted with respect to the collecting means.

5. In a device of the class described, a vehicle, a conveyor on the vehicle, rake teeth on the vehicle and cooperating with the conveyor, and mechanism for imparting oscillatory movement to the rake teeth, toward and away from the conveyor, said mechanism comprising a shaft supported for rocking movement on the vehicle and having oppositely disposed arms, and links pivoted to the arms and to the teeth.

6. In a device of the class described, a vehicle, a conveyor on the vehicle, rake teeth on the vehicle and cooperating with the conveyor, and mechanism for imparting oscillatory movement to the rake teeth, toward and away from the conveyor, said mechanism comprising shafts supported for rotation on the vehicle, arms carried by one shaft, links pivoted to the arms, and to the rake teeth, a crank member fixed on said one shaft, a crank member rotatable with respect to said other shaft, a clutch on said other shaft and operable to connect the last-specified crank member thereto, means for driving said other shaft, and a pitman pivoted to the crank members.

7. In a device of the class described, a vehicle, a conveyor on the vehicle, rake teeth on the vehicle and cooperating with the conveyor, mechanism for operating the conveyor, mechanism for imparting oscillatory movement to the rake teeth, toward and away from the conveyor, a single power-driven part on the vehicle, and means for connecting each of said mechanism to said part.

8. In a device of the class described, a vehicle, a conveyor on the vehicle, rake teeth on the vehicle and cooperating with the conveyor, mechanism for operating the conveyor, mechanism for imparting oscillatory movement to the rake teeth, toward and away from the conveyor, a power-driven shaft on the vehicle and connected to the mechanism for operating the conveyor, and means under the control of an operator for connecting the mechanism for imparting oscillatory movement to the rake teeth with the shaft, thereby to drive the last-specified mechanism intermittently.

9. In a device of the class described, a vehicle, a conveyor on the vehicle, rake teeth on the vehicle and cooperating with the conveyor, mechanism for operating the conveyor, mechanism for imparting oscillatory movement to the rake teeth, toward and away from the conveyor, a single power-driven part on the vehicle, a clutch connection between the first-specified mechanism and said power-driven part, and a speed-change connection between the second-specified mechanism and said power-driven part.

10. In a device of the class described, a vehicle, a conveyor on the vehicle, first and second shafts journaled on the vehicle, means for connecting the first shaft with the conveyor to operate the conveyor, means for driving the second shaft, and a speed-change mechanism connecting the shafts, the speed-change mechanism embodying oppositely tapered, elongated pulleys on the shafts, a belt engaged about the pulleys, and means under the governance of an operator for shifting the belt longitudinally of the pulleys.

11. In a device of the class described, a vehicle comprising movably connected upper and lower frames, soil-engaging supporting means on the lower frame, a rake carried by the upper frame, a conveyor cooperating with the rake and mounted on the upper frame, and mechanism under the control of an operator and connecting the frames to secure a raising and lowering of the upper frame, the rake, and the conveyor.

12. In a device of the class described, a vehicle comprising movably connected upper and lower frames, soil-engaging supporting means on the lower frame, a rake carried by the upper frame, a conveyor cooperating with the rake and mounted on the upper frame, a cylinder connected to one frame, a piston slidable in the cylinder and connected to the other frame, and means for supplying pressure to the cylinder to secure a raising and lowering of the upper frame, the conveyor, and the rake.

13. In a device of the class described, a vehicle, a conveyor on the vehicle, rake teeth mounted on the vehicle and cooperating with the conveyor, means for adjusting the rake teeth toward and from the conveyor, and means for imparting oscillatory movement to the rake teeth, at the will of an operator, toward and away from the conveyor.

14. In a device of the class described, a vehicle, a conveyor on the vehicle, a shaft mounted to rock on the vehicle, teeth carried by the shaft and cooperating with the conveyor, and mechanism for rocking the shaft to adjust the position of the teeth with respect to the conveyor.

15. In a device of the class described, a vehicle, a conveyor on the vehicle, a shaft mounted to rock on the vehicle, a rake carried by the shaft and cooperating with the conveyor; and mechanism for rocking the shaft to adjust the position of the rake with respect to the conveyor, said mechanism comprising a screw held for rotation but against longitudinal movement, means for rotating the screw, an arm on the shaft, and a nut pivoted to the arm, the screw being threaded into the nut.

16. In a device of the class described, a vehicle, a conveyor on the vehicle, a rake cooperating with the conveyor, means for supporting the rake resiliently, means for adjusting the rake in a substantially horizontal direction, and means for adjusting the rake in a substantially vertical position.

17. In a device of the class described, a vehicle, a conveyor on the vehicle, a substantially horizontal spring arm carried by the vehicle, a shaft journaled on the spring arm, a rake secured to the shaft and cooperating with the conveyor, and means for rocking the shaft to adjust the rake with respect to the conveyor and to the surface of the soil.

18. In a device of the class described, a vehicle, a conveyor on the vehicle, a substantially horizontal arm, a rake carried by the arm and cooperating with the conveyor, an eccentric journaled on the vehicle, means for rotating the eccentric, a strap on the arm and cooperating with the eccentric, and means for supporting the arm at a point between the eccentric and the rake.

19. In a device of the class described, a vehicle, a conveyor on the vehicle, a substantially horizontal arm, a rake carried by the arm and cooperating with the conveyor, a casing, means for mounting the casing on the vehicle for adjustment in a substantially horizontal direction, mechanism on the casing and connected to the arm for moving the arm, and means for supporting the arm between said mechanism and the rake.

20. In a device of the class described, a vehicle, a conveyor on the vehicle, a substantially horizontal arm, a rake carried by the arm and cooperating with the conveyor, a casing, mechanism on the casing and connected to the arm for moving the arm, means for supporting the arm, means for mounting the casing on the vehicle for adjustment in a substantially vertically direction, and means for mounting the casing on the vehicle for adjustment in a substantially horizontal direction.

21. In a device of the class described, a vehicle, a conveyor on the vehicle, a substantially horizontal arm, a rake carried by the arm and cooperating with the conveyor, a casing, means for mounting the casing on the vehicle for adjustment in a substantially vertical direction, mechanism on the casing and connected to the arm for moving the arm, and means for supporting the arm.

22. In a device of the class described, a vehicle, a conveyor on the vehicle, a substantially horizontal arm, a rake carried by the arm and cooperating with the conveyor, a strap on the arm, a casing, a shaft journaled in the casing, an eccentric on the shaft and cooperating with the strap, means on the casing for holding the shaft against rotation, means on the casing for engaging the arm at a point between the rake and the eccentric, means for mounting the casing for vertical adjustment on the vehicle, and means for mounting the casing for horizontal adjustment on the vehicle.

23. In a device of the class described, a vehicle comprising a frame, a substantially vertical shaft journaled on the frame and comprising an inclined end, a first soil-engaging member mounted on the inclined end of the shaft, means for raising the frame when the shaft is rotated by the action of the first soil-engaging member, as the forward movement of the vehicle is changed to a movement having a rearward tendency, a second soil-engaging member disposed in advance of the first soil-engaging member, means for connecting the second soil-engaging member to the frame, so that the second soil-engaging member will support the frame when the vehicle moves ahead, the last-specified means being yieldable to lower the frame and throw the weight on the first soil-engaging member as the forward movement of the vehicle is changed to a movement having a rearward tendency, a combined collecting and delivery mechanism, and means for carrying the collecting and delivery mechanism on the frame.

24. A device of the class described, constructed as set forth in claim 23, and further characterized by the fact that the means for raising the frame embodies interengaged, relatively-inclined parts carried respectively by the frame and by the shaft.

25. A device of the class described, constructed as set forth in claim 23, and further characterized by the fact that the means for raising the frame embodies a bearing wherein the shaft is rotatable, the bearing being provided in its lower end with a seat, and an offset roller carried by the shaft and engaged in the seat to hold the first soil-engaging member parallel to the line of advance as the vehicle moves ahead.

26. In a device of the class described, a vehicle comprising a frame, a substantially vertical shaft journaled on the frame, a castor wheel journaled on the shaft in offset relation to the axis of the shaft, interengaging elements on the shaft and the frame for raising the frame when the shaft is rotated by the action of the castor wheel as the forward movement of the vehicle is changed to a movement having a rearward tendency, a soil-engaging shoe disposed in advance of the castor wheel, links pivoted to the shoe and to the frame, and a flexible connection between the forward end of the shoe and the frame, whereby the shoe will support the frame when the vehicle moves ahead, and permit the links to tilt and throw the weight on the castor wheel when the forward movement of the vehicle is changed to a movement having a rearward tendency, a combined collecting and delivery mechanism, and means for carrying the collecting and delivery mechanism on the frame.

27. The combination with a combine comprising a body and a lateral platform, of a vehicle disposed to the rear of the platform, means for connecting the forward end of the vehicle to the platform, spaced soil-engaging members on the rear end of the vehicle, a flexible connection between the rear portion of the vehicle and the combine, the connection and the soil-engaging members constituting a three-point support for the rear portion of the vehicle, and a combined collecting and delivery mechanism mounted on the vehicle and discharging forwardly above the platform of the combine.

In testimony that I claim the foregoing as my own, I have hereto affixed my signature.

HENRY STRUEVER.